US007268885B2

(12) United States Patent
Chan et al.

(10) Patent No.: US 7,268,885 B2
(45) Date of Patent: Sep. 11, 2007

(54) OPTICAL IMAGE MEASURING APPARATUS FOR FORMING AN IMAGE OF AN OBJECT TO BE MEASURED BASED ON INTERFERENCE LIGHT

(75) Inventors: Kinpui Chan, Yamagata (JP); Masahiro Akiba, Yamagata (JP); Yasufumi Fukuma, Tokyo (JP); Hiroyuki Otsuka, Tokyo (JP); Hisashi Tsukada, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 229 days.

(21) Appl. No.: 11/073,712

(22) Filed: Mar. 8, 2005

(65) Prior Publication Data

US 2005/0206906 A1    Sep. 22, 2005

(30) Foreign Application Priority Data

Mar. 16, 2004    (JP)    ............................. 2004-074409

(51) Int. Cl.
    *G01B 9/02*    (2006.01)
(52) U.S. Cl. ..................................... 356/489; 356/497
(58) Field of Classification Search ................ 356/479, 356/497, 489
    See application file for complete search history.

(56) References Cited

U.S. PATENT DOCUMENTS 5,392,121 A    2/1995    Hosaka et al.

FOREIGN PATENT DOCUMENTS

| JP | 2001-066247 | 3/2001 |
|---|---|---|
| JP | 3245135 | 10/2001 |
| JP | 2001-330558 | 11/2001 |

OTHER PUBLICATIONS

Translation of Akiba(2001-330558) cited by applicant.*
Translation of Tanno et al(2001-066247) cited by applicant.*
M. Akiba et al.: "Full-field optical coherence tomography by two-dimensional heterodyne detection with a pair of CCD cameras," *Optic Letters*, vol. 28, No. 10, May 15, 2003, pp. 816-818.

(Continued)

*Primary Examiner*—Samuel A. Turner
(74) *Attorney, Agent, or Firm*—Edwards Angell Palmer & Dodge LLP

(57) ABSTRACT

An optical image measuring apparatus capable of effectively obtaining a direct current component of a heterodyne signal which is composed of background light of interference light is provided. The optical image measuring apparatus includes: an optical interference system in which a light beam from a light source is divided into signal light and reference light by a beam splitter, a frequency of the reference light is shifted by a frequency shifter, and the signal light propagating through an object to be measured and the reference light reflected on a mirror are superimposed on each other by the beam splitter to produce interference light; beam splitters for dividing the interference light into interference light beams; shutters serving as an intensity modulating unit for modulating intensities of the respective interference light beams at predetermined intervals; CCDs for receiving the respective interference light beams whose intensities are modulated and outputting electrical signals; and a signal processing portion serving as a calculating unit for calculating an intensity of the direct current component corresponding to the background light of the interference light based on the outputted electrical signals.

13 Claims, 6 Drawing Sheets

OTHER PUBLICATIONS

K.P. Chan et al.: "Micrometre-resolution, optical imaging of objects through highly scattering media using a heterodyne detector array," Electronics Letters, vol. 30, No. 21, Oct. 13, 1994, pp. 1753-1754.
Naohiro Tanno: "The imaging technique of the optical coherence tomography and its application to living organism image," *Kogaku* (*Japanese Journal of Optics*), vol. 28, No. 3, 116, (1999), pp. 115-125 (discussed in the specification).
Yoshizawa et al.: *New Technology Communications* (2003), "Optical Heterodyne Technology," 7 pages (discussed in the specification).

* cited by examiner

OPTICAL IMAGE MEASURING APPARATUS FOR FORMING AN IMAGE OF AN OBJECT TO BE MEASURED BASED ON INTERFERENCE LIGHT

BACKGROUND OF THE INVENTION

1. Field of the Invention

The present invention relates to an optical image measuring apparatus employing a structure in which an object to be measured which is particularly a light scattering medium is irradiated with a light beam and a surface form or inner form of the object to be measured is measured based on a reflected light beam or a transmitted light beam to produce an image of a measured form. More particularly, the present invention relates to an optical image measuring apparatus for measuring the surface form or inner form of the object to be measured by using an optical heterodyne detection method to produce the image of the measured form.

2. Description of the Related Art

In recent years, attention has been given to optical imaging techniques for producing an image of a surface or inner portion of an object to be measured using a laser light source or the like. In contrast to the conventional X-ray CT technique, optical imaging technique is not hazardous to human bodies. Therefore, its application to the field of medical imaging is highly desired.

An example of a typical method of the optical imaging technique is a low coherent interference method (also called "optical coherent tomography" or the like). This method uses the low coherence of a broad band light source having a wide spectral width, such as a super luminescent diode (SLD). According to this method, reflection light from an object to be measured or light transmitting therethrough can be detected with a superior distance resolution of µm order (for example, see Naohiro Tanno, Kogaku (Japanese Journal of Optics), Volume 28, No. 3, 116 (1999)).

FIG. 8 shows a fundamental structure of a conventional optical image measuring apparatus based on a Michelson interferometer, serving as an example of an apparatus using the low coherent interference method. An optical image measuring apparatus 100 includes a wide band light source 101, a mirror 102, a beam splitter (half mirror) 103, and a photo detector 104. An object to be measured 105 is made of a scattering medium. A light beam from the broad band light source 101 is divided by the beam splitter 103 into two parts, that is, a reference light R propagating to the mirror 102 and a signal light S propagating to the object to be measured 105. The reference light R is a light beam reflected by the beam splitter 103. The signal light S is a light beam transmitting through the beam splitter 103.

Here, as shown in FIG. 8, the propagating direction of the signal light S is set as a z-axis and a plane orthogonal to the propagating direction of the signal light S is defined as an x-y plane. The mirror 102 is shiftable in either the forward and backward directions, as indicated by a double-headed arrow in FIG. 8 (z-scanning direction).

The reference light R is subjected to a Doppler frequency shift by z-scanning when is reflected by the z-scanning mirror 102. On the other hand, the signal light S is reflected from the surface of the object to be measured 105 and from the inner layers thereof when the object to be measured 105 is irradiated with the light. Because the object to be measured 105 is a scattering medium, the signal light S reflected from the object may include the multiply scattered light wave having random phases. The signal light reflected from the object to be measured 105 and the reference light reflected from the mirror 102 to be subjected to the frequency shift are superimposed on each other by the beam splitter 103 to produce an interference light.

In the image measurement using the low coherent interference method, interference occurs only when a difference in optical path length between the signal light S and the reference light R is within the coherent length, of the broad band light source 101, which is of the order of several µm to tens of µm. In addition, only the component of the signal light S whose phase is correlated to that of the reference light R interferes with the reference light R. That is, only the coherent signal light component of the signal light S selectively interferes with the reference light R. Based on these principles, the position of the mirror 102 is shifted by the z-scanning operation to vary the optical path length of the reference light R, so a reflectance profile of the inner layers of the object to be measured 105 is measured. The interference light is detected by the photo detector 104 during each z-scan. An electrical signal (heterodyne signal) output from the photo detector 104 provides a backscatter profile of the inner layers of object to be measured 105, and a two-dimensional cross-sectional image of the object to be measured 105 is produced by scanning the signal light S across the object to be measured 105 while recording the reflectance profile at each transverse position (see Naohiro Tanno, Kogaku (Japanese Journal of Optics), Volume 28, No. 3, 116 (1999)).

Assume that an intensity of the reference light R and an intensity of the signal light S which are superimposed by the beam splitter 103 are given by $I_r$ and $I_s$, respectively, and a frequency difference between the reference light R and the signal light S and a phase difference therebetween are given by $f_{if}$ and $\Delta\theta$, respectively. In this case, a heterodyne signal as expressed by the following expression is outputted from the photo detector (for example, Yoshizawa and Seta "Optical Heterodyne Technology (revised edition)", New Technology Communications (2003), p. 2).

$$i(t)I_r + I_s + 2\sqrt{I_r I_s} \cos(2\pi f_{if} t + \Delta\theta) \tag{1}$$

The third term of the right side of the expression (1) indicates an alternating current electrical signal and the frequency $f_{if}$ thereof is equal to the frequency difference between the reference light R and the signal light S. The frequency $f_{if}$ of an alternating current component of the heterodyne signal is called a beat frequency or the like. The first and second terms of the right side of the expression (1) indicate the direct current components of the heterodyne signal and correspond to the background light intensity.

However, when the two-dimensional cross-sectional image is intended to be obtained by means of the conventional low coherent interference method, it is necessary to scan the signal light beam S across the reflectance profile at the object to be measured 105 and to successively detect reflection light waves from each transverse position. Therefore, the measurement of the object to be measured 105 can be time consuming. In addition, it is hard to shorten a measurement time in view of measurement fundamentals.

In views of such problems, an optical image measuring apparatus for shortening a measurement time has been proposed. FIG. 9 shows a fundamental structure of an example of such an apparatus. As shown in FIG. 9, an optical image measuring apparatus 200 includes a broad band light source 201, a mirror 202, a beam splitter (half mirror) 203, a two-dimensional photo sensor array 204 serving for light detection, and lenses 206 and 207. A light beam from the light source 201 is converted into a parallel light flux by the lenses 206 and 207 and a beam diameter thereof is increased thereby. Then, the parallel light flux is divided by the beam splitter 203 into two, that is, the reference light R and the signal light S. The reference light R is subjected to a Doppler frequency shift by z-scanning of the mirror 202. On the other hand, the signal light S is incident on the object to be measured 205 over a wide area of the x-y plane, as a consequence of a widened beam diameter. Therefore, the signal light S reflected from the object to be measured 205 contains information related to the surface and inner portion of the object to be measured 205 over a wide area. The reference light R and the signal light S are superimposed on each other by the beam splitter 103 and detected by the elements (photo sensors) arranged in parallel on the surface of the two-dimensional photo sensor array 204. Thus, it is possible to obtain a two-dimensional cross-sectional image of the object to be measured 205 in real time without scanning the signal light S.

An apparatus described by K. P. Chan, M. Yamada, and H. Inaba in Electronics Letters, Vol. 30, 1753 (1994) has been known as such a non-scanning type optical image measuring apparatus. In the apparatus described in the same document, a plurality of heterodyne signals outputted from a two-dimensional photo sensor array are inputted to signal processing systems arranged in parallel to detect the amplitude and phase of each of the heterodyne signals.

However, when spatial resolution of an image is intended to be improved, it is necessary to increase the number of elements of the array. In addition, it is necessary to prepare a signal processing system including the number of channels corresponding to the number of elements. Therefore, it is likely to be hard to actually use the apparatus in fields that require a high-resolution image, such as a medical field and an industrial field.

Thus, the inventors of the present invention proposed the following non-scanning type optical image measuring apparatus in JP 2001-330558 A (claims, specification paragraphs [0068] to [0084], FIGS. 1 and 3). The optical image measuring apparatus according to the present proposal includes a light source for emitting a light beam, an interference optical system, and a signal processing portion. In the interference optical system, the light beam emitted from the light source is divided into two, that is, a signal light propagating through an examined object locating position in which an object to be examined is located, and a reference light propagating along an optical path different from an optical path passing through the examined object locating position. The signal light propagating through the examined object locating position and the reference light propagating along a different optical path are superimposed on each other to produce the interference light. The optical interference system includes a frequency shifter, light cutoff devices, and photo sensors. The frequency shifter shifts a frequency of the signal light and a frequency of the reference light relative to each other. In order to receive the interference light in the interference optical system, the interference light is divided into two parts. The light cutoff devices periodically cut off the two divided parts of the interference light to generate two interference light pulse trains with a phase difference of 90 degrees therebetween. The photo sensors respectively receive the two interference light pulse trains. The photo sensors each have a plurality of light receiving elements which are spatially arranged and each of which separately obtains a light receiving signal. The signal processing portion combines a plurality of light receiving signals obtained by each of the photo sensors to generate signals of the signal light which correspond to respective points of interest of a surface or inner layers of the object to be examined which is located in the examined object locating position on a propagation path of the signal light.

In the optical image measuring apparatus, the interference light in which the reference light and the signal light interfere with each other is divided into two parts and the two parts of the interference light are received by the two photo sensors (two-dimensional photo sensor arrays) and respectively sampled by the light cutoff devices disposed in fronts of both sensor arrays. A phase difference of $\pi/2$ is provided between sampling periods of the two divided parts of the interference light. Therefore, an intensity of the signal light and an intensity of reference light which compose background light of the interference light and phase quadrature components (sine component and cosine component) of the interference light are detected. In addition, an intensity of the background light included in the outputs from both the sensor arrays is subtracted from the outputs of both the sensor arrays to calculate two phase quadrature components of the interference light. An amplitude of the interference light is obtained based on a result obtained by calculation.

In the case of measurement using the optical image measuring apparatus, it is necessary to separately obtain an intensity of a direct current component of a heterodyne signal corresponding to the background light of the interference light. More specifically, the interference light is continuously received with the shutter opened and time averaging of a result obtained by receiving the light is performed to obtain the direct current component. However, other obtaining methods are not specifically disclosed, so the degree of freedom of a measurement mode is small. Therefore, in order to improve the operability and the degree of freedom of an apparatus structure, it may be necessary to devise other measurement modes.

In addition, the inventors of the present invention proposed the following optical image measuring apparatus in JP 3245135 B (claims and specification (paragraphs [0072] to [0082])). The optical image measuring apparatus according to this proposal includes a light source for emitting a light beam and an interference optical system. In the interference optical system, the light beam emitted from the light source is divided into two, that is, signal light propagating through an examined object locating position in which an object to be examined is located and reference light propagating on an optical path different from an optical path passing through the examined object locating position. The signal light propagating through the examined object locating position and the reference light propagating on the different optical path are superimposed on each other to produce interference light in which the signal light and the reference light interfere with each other. The interference optical system includes a frequency shifter and an optical device. The frequency shifter shifts a frequency of the signal light and a frequency of the reference light relative to each other. The optical device is disposed on an optical path of at least one of the signal light and the reference light and periodically cuts off light. The cutoff frequency of the optical device is set to be equal to a frequency difference between the signal light and the reference light. According to the optical image measuring apparatus, the interference light can be sampled at the cutoff frequency equal to a beat frequency, so suitable optical heterodyne measurement is realized.

Even in the optical image measuring apparatus, it is necessary to separately measure the direct current component composed of the background light of the interference light. More specifically, a method is disclosed in which a phase is shifted to $\pi$ and $\pi/2$ to perform sampling twice and a result obtained by measurement is subjected to arithmetic processing to calculate the direct current component. As in the case where the problem related to JP 2001-330558 A is intended to be solved, it is preferable that the direct current component can be calculated by another method.

If the direct current component composed of the background light can be obtained by one-time measurement without separate measurement in the optical image measuring apparatus described in JP 2001-330558 A and JP 3245135 B, simple measurement is realized to shorten a measurement time. However, it is hard to realize this by the optical image measuring apparatus described in those patent documents.

Further, according to the patent documents, specific matters related to a duty ratio and a waveform of a sampling function in the case of sampling of the interference light are not taken into account. In JP 2001-330558, a "rectangular" function is used. However, in order to increase the degree of freedom of a measurement mode or to realize more effective measurement, some devices need to be made on such matters. With respect to the sampling frequency, only the case where it is equal to the beat frequency is referred to. Therefore, it may be necessary to provide further variations to increase the degree of freedom of a sampling mode in view of applications to the apparatus.

SUMMARY OF THE INVENTION

The present invention has been made in view of the above-mentioned circumstances. An object of the present invention is to provide an optical image measuring apparatus capable of effectively obtaining a direct current component of a heterodyne signal composed of background light of interference light.

Another object of the present invention is to provide an optical image measuring apparatus in which usefulness is improved by an increase in degree of freedom of a sampling mode for interference light.

In order to attain the above-mentioned object, according to a first aspect of the present invention, there is provided an optical image measuring apparatus for forming an image of an object to be measured based on interference light, including: a light source for emitting a light beam; an interference optical system that divides the light beam emitted from the light source into signal light propagating through the object to be measured and reference light propagating through a predetermined reference object, shifts a frequency of the signal light and a frequency of the reference light relative to each other, and then superimposes the signal light propagating through the object to be measured and the reference light propagating through the predetermined reference object on each other to produce the interference light; intensity modulating means for modulating an intensity of the interference light at a predetermined frequency; a photo detector for receiving the interference light whose intensity is modulated and converting the received interference light into an electrical signal to be outputted; and calculating means for calculating an intensity of a direct current component composed of background light of the interference light based on the electrical signal outputted from the photo detector.

Further, according to a second aspect of the present invention, there is provided an optical image measuring apparatus, including: a light source for emitting a light beam; an interference optical system that divides the light beam emitted from the light source into signal light propagating through the object to be measured and reference light propagating through a predetermined reference object, shifts a frequency of the signal light and a frequency of the reference light relative to each other, and then superimposes the signal light propagating through the object to be measured and the reference light propagating through the predetermined reference object on each other to produce the interference light; optical path dividing means for driving an optical path of the interference light produced by the optical interference system into a plurality of optical paths to produce a plurality of interference light beams; at least one intensity modulating means for modulating an intensity of at least one of the interference light beams at a predetermined frequency, which is provided on at least one first optical path of the plurality of optical paths; a plurality of photo detectors each provided on each of the plurality of optical paths, where at least one first photo detector of the plurality of photo detectors which is provided on the first optical path receives at least one interference light beam whose intensity is modulated and converts the received interference light beam into an electrical signal to be outputted and at least one second photo detector of the plurality of photo detectors which is provided on at least one second optical path other than the first optical path receives at least one interference light beam and converts the received interference light beam into an electrical signal to be outputted; and calculating means for calculating an intensity of a direct current component based on the electrical signal outputted from the photo detector provided on a predetermined optical path of the plurality of optical paths, wherein an image of the object to be measured is formed based on the interference light beams propagating on the plurality of optical paths.

Here, the term "at least one first (second) optical path" means an arbitrary number of optical paths out of the plural (N) optical paths, that is, 1 to N optical paths.

Further, according to a third aspect of the present invention, in the optical image measuring apparatus according to the second aspect of the present invention, the predetermined optical path includes at least two optical paths, on each of which the intensity modulating means is provided, each of the at least two intensity modulating means provided on the optical paths modulates the intensity of the interference light beam such that a part of the interference light beam in which a phase difference is π (180 degrees) is received by the photo detector provided on a corresponding optical path, and the calculating means time-averages the electrical signals outputted from the photo detectors to calculate the intensity of the direct current component.

Further, according to a fourth aspect of the present invention, in the optical image measuring apparatus according to the second aspect of the present invention, the optical image measuring apparatus according to the second aspect, wherein the predetermined optical path includes an optical path in which the intensity modulating means is not provided, and the calculating means time-averages the electrical signal outputted from the photo detector located on the optical path in which the intensity modulating means is not provided to calculate the intensity of the direct current component.

Further, according to a fifth aspect of the present invention, in the optical image measuring apparatus according to the first or second aspect of the present invention, the intensity modulating means modulates the intensity of the interference light beam plural times such that a part of the interference light beam in which a phase difference is π is received by the photo detector, the photo detector receives the interference light beam corresponding to each intensity modulation and outputs the received interference light beam as an electrical signal, and the calculating means time-averages the electrical signal corresponding to each intensity modulation which is outputted from the photo detector to calculate the intensity of the direct current component.

Further, according to a sixth aspect of the present invention, in the optical image measuring apparatus according to the first or second aspect of the present invention, the intensity modulating means modulates the intensity of the interference light beam at a frequency which is not synchronized with a beat frequency of the interference light beam, and the calculating means time-averages the electrical signal outputted from the photo detector based on the interference light beam whose intensity is modulated at the frequency to calculate the intensity of the direct current component.

Further, according to a seventh aspect of the present invention, there is provided an optical image measuring apparatus for forming an image of an object to be measured based on interference light, including: a light source for emitting a light beam; an optical interference system that divides the light beam emitted from the light source into signal light propagating through the object to be measured and reference light propagating through a predetermined reference object, shifts a frequency of the signal light and a frequency of the reference light relative to each other, and then superimposes the signal light propagating through the object to be measured and the reference light propagating through the predetermined reference object on each other to produce the interference light; intensity modulating means for modulating an intensity of the interference light at a predetermined frequency; photo detection means for receiving the interference light whose intensity is modulated and converting the received interference light into an electrical signal to be outputted; and calculating means for calculating an intensity of a direct current component composed of background light of the interference light and at least one of an intensity and phase of an alternating current component of the interference light based on the electrical signal outputted from photo detection means.

Further, according to an eighth aspect of the present invention, the optical image measuring apparatus according to the seventh aspect of the present invention further includes light receiving time changing means for changing a light receiving time of the interference light beam received by the photo detection means between a first light receiving time equal to or longer than a beat period of the interference light beam and a second light receiving time shorter than the beat period in accordance with the beat period, wherein the calculating means time-averages an electrical signal outputted from the photo detection means to calculate the intensity of the direct current component when the light receiving time is changed to the first light receiving time by the light receiving time changing means, and calculates at least one of the intensity and phase of the alternating current component based on an electrical signal outputted from the photo detection means when the light receiving time is changed to the second light receiving time and the direct current component whose intensity is calculated corresponding to the first light receiving time.

Further, according to a ninth aspect of the present invention, in the optical image measuring apparatus according to the eighth aspect of the present invention, the light receiving time changing means changes the light receiving time every beat period of the interference light, and the first light receiving time is the beat period.

Further, according to a tenth aspect of the present invention, in the optical image measuring apparatus according the eighth aspect of the present invention, the light receiving time changing means changes the light receiving time every beat period of the interference light, and the second light receiving time is half of the beat period.

Further, according to an eleventh aspect of the present invention, in the optical image measuring apparatus according the seventh aspect of the present invention, the predetermined frequency at which the intensity of the interference light is modulated by the intensity modulating means is an integral multiple of a beat frequency of the interference light.

Further, according to a twelfth aspect of the present invention, in the optical image measuring apparatus according any one of the first to eleventh aspects of the present invention, the intensity modulating means includes shutter means for cutting off the interference light at the predetermined frequency.

According to the present invention, the optical image measuring apparatus includes: the intensity modulating means for modulating the intensity of the interference light at the predetermined frequency; the photo detection means for receiving the interference light whose intensity is modulated and converting the received interference light into the electrical signal to be outputted; and the calculating means for calculating the intensity of the direct current component composed of the background light of the interference light based on the outputted electrical signal. Consequently, it is possible to effectively obtain the direct current component composed of the background light of the interference light.

According to the optical image measuring apparatus according to any one of the first to sixth aspects of the present invention, the direct current component can be obtained based on the electrical signal outputted from one or two photo detection means. Consequently, it is possible to effectively obtain the direct current component according to the number of photo detection means provided in the optical image measuring apparatus.

In particular, according to the optical image measuring apparatus according to the fourth aspect of the present invention, the direct current component can be obtained based on the electrical signal outputted from the photo detection means on the optical path in which the intensity modulating means is not provided. Consequently, an apparatus structure can be simplified.

According to the optical image measuring apparatus according to any one of the eighth to tenth aspects of the present invention, the direct current component is effectively calculated corresponding to the change of the light receiving time of the interference light received by the photo detection means, to the first light receiving time. In addition, the alternating current component is calculated based on a result obtained by calculation of the direct current component, corresponding to the change of the light receiving time to the second light receiving time. Consequently, when the optical image measuring apparatus is applied to measurement performed during, for example, scanning in a depth direction of the object to be measured (z-scanning), the alternating current component can be successively obtained based on a value of the direct current component calculated just before. Thus, the measurement precision can be improved.

According to the optical image measuring apparatus of the present invention according to the eleventh aspect of the present invention, the interference light can be sampled at various frequencies. Consequently, it is possible to increase the degree of freedom of the structure.

BRIEF DESCRIPTION OF THE DRAWINGS

In the accompanying drawings:

FIGS. 2A to 2C are diagrams showing an example of an interference light sampling mode of the optical image measuring apparatus according to the embodiment of the present invention, in which FIG. 2A is a graph showing a time waveform of interference light, FIG. 2B is a graph showing an example of a waveform of a sampling function, and FIG. 2C is a graph showing a waveform of sampled interference light;

DETAILED DESCRIPTION OF THE EMBODIMENT

Hereinafter, an example of an optical image measuring apparatus according to an embodiment of the present invention will be described in detail with reference to the accompanying drawings.

In brief, according to the optical image measuring apparatus of the present invention, in order to effectively obtain an intensity of a direct current component composed of background light of interference light in which signal light propagating through an object to be measured and reference light propagating through a reference object interfere with each other, an intensity of the interference light is periodically modulated. The periodically modulated interference light is received and outputted as an electrical signal (heterodyne signal). The intensity of the direct current component is calculated based on the outputted heterodyne signal. In addition, according to the optical image measuring apparatus of the present invention, various sampling modes effective in obtaining characteristics of the interference light are provided. Examples of the characteristics of the interference light include the direct current component indicated in the above-mentioned expression (1), a signal intensity of the interference light, and a spatial phase distribution thereof.

Hereinafter, an optical image measuring apparatus having a structure capable of obtaining the intensity of the direct current component composed of the background light, the signal intensity of the interference light, and the spatial phase distribution thereof based on the heterodyne signals obtained from three interference light beams into which the interference light is divided will be described as an embodiment of the present invention. In some methods of obtaining the direct current component and some sampling modes, it is unnecessary to divide the interference light into three. Therefore, as suitably described later, it is possible to employ a structure in which the interference light is not divided, a structure in which the interference light is divided into two, or a structure in which the interference light is divided into four or more.

[Structure of Apparatus]

Figure 1:
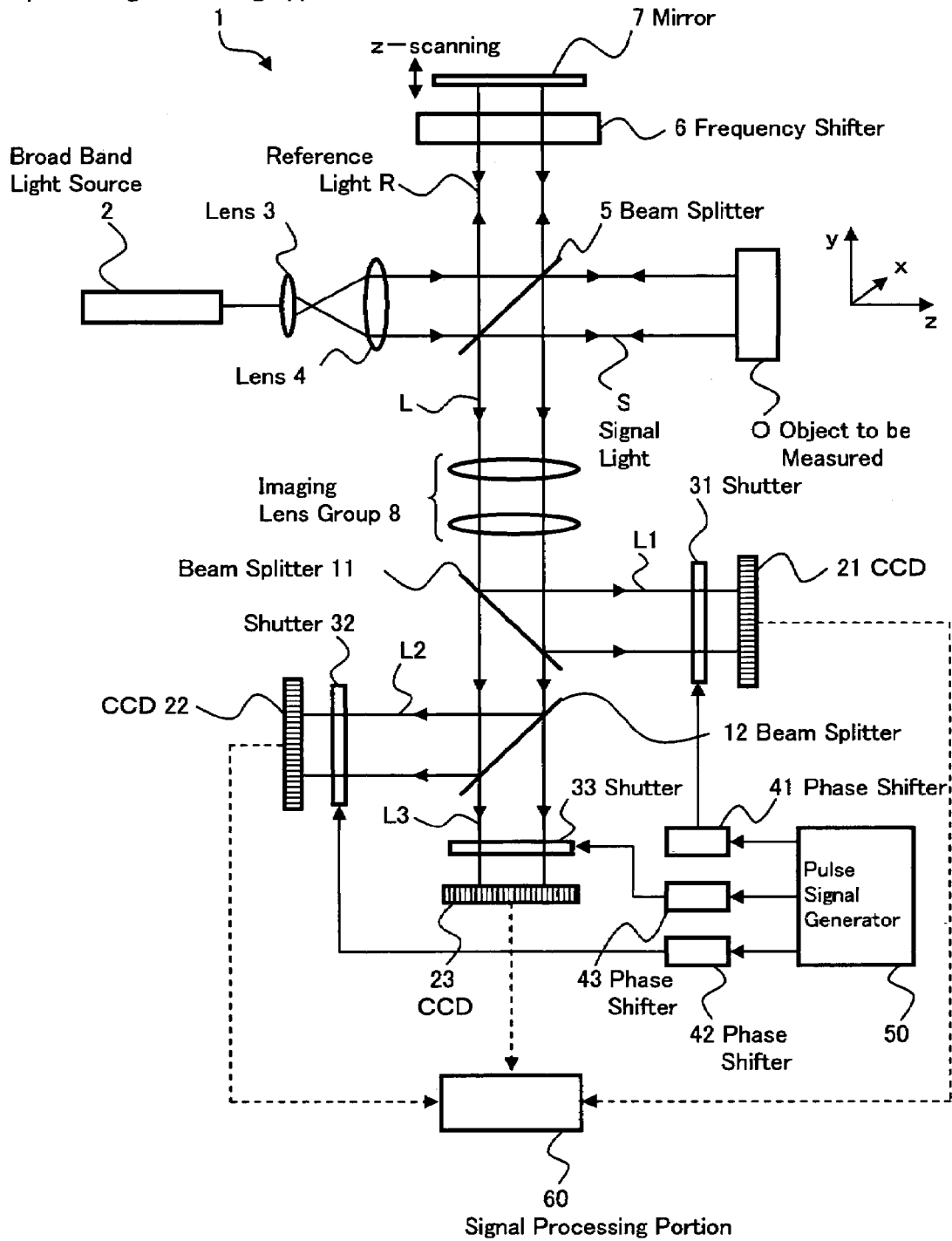
FIG. 1 is a schematic diagram showing an example of an optical image measuring apparatus according to an embodiment of the present invention.

FIG. 1 shows an example of a schematic structure showing an optical image measuring apparatus 1 according to the present invention, which is constructed to divide the interference light into three to perform measurement. The optical image measuring apparatus 1 is an apparatus available for, for example, medical care and industry and has a structure for obtaining two-dimensional sectional images of an object to be measured O which is made of a scattering medium at respective depths (in z-direction) to form a three-dimensional image.

As in the conventional apparatus, the optical image measuring apparatus 1 includes a wide band light source 2, lenses 3 and 4, a beam splitter 5, and a mirror 7. The light source 2 is composed of a SLD, a light emitting diode (LED), or the like and outputs a low-coherent light beam. The lenses 3 and 4 convert the light beams from the light source 2 into a parallel light flux and increase abeam diameter thereof. The beam splitter 5 divides the light beam into signal light S and reference light R and superimposes the signal light S and the reference light R on each other to produce interference light L. The mirror 7 is a total reflection mirror. The light source 2 suitably outputs the light beam such as continuous light or pulse light. Note that a coherent length of an available near-infrared region SLD is about 30 µm and a coherent length of an LED is about 10 µm. Although not shown, a drive device for moving the mirror 7 in a propagating direction of the reference light (z-scanning) is provided.

A frequency shifter 6 composed of an optoelectronic modulator, an acoustooptic modulator, or the like is disposed immediately in front of the mirror 7 and shifts a frequency of the reference light R passing therethrough. When a structure is employed in which the reference light R is subjected to Doppler frequency shift by the z-scanning of the mirror 7, the frequency shifter 6 is unnecessary. For example, when it is necessary to increase a shift amount of the frequency (that is, beat frequency) of the reference light R, the apparatus may be constructed such that both the frequency shifter 6 and the z-scanning can be used.

The lenses 3 and 4, the beam splitter 5, the frequency shifter 6, and the mirror 7 compose an "interference optical system" in the present invention. The mirror 7 composes a "reference object" in the present invention.

The optical image measuring apparatus 1 further includes an imaging lens group 8, beam splitters 11 and 12, CCDs (cameras) 21, 22, and 23, and shutters 31, 32, and 33. The imaging lens group 8 images the interference light L produced by the beam splitter 5. The beam splitters 11 and 12 divide the interference light L into three interference light beams L1, L2, and L3. Each of the CCDs 21, 22, and 23 is a storage type two-dimensional photo sensor array for interference light beam detection. The shutters 31, 32, and 33 are disposed immediately in front of the CCDs 21, 22, and 23, respectively and periodically cut off the interference light beams L1, L2, and L3, respectively. Each of the shutters 31, 32, and 33 is, for example, a high-speed shutter such as a liquid crystal shutter.

The shutters 31, 32, and 33 are not necessarily disposed immediately in front of the CCDs 21, 22, and 23, respectively. The shutters 31, 32, and 33 can be respectively disposed at arbitrary positions on respective optical paths joining branch points of the interference light beams L1, L2, and L3 separated by the beam splitters 11 and 12 with the CCDs 21, 22, and 23. That is, the shutters 31, 32, and 33 may be disposed at positions in which the respective interference light beams L1, L2, and L3 can be cut off to change the quantities of light beams received by the CCDs 21, 22, and 23 to 0.

The beam splitters 11 and 12 compose an "optical path dividing means" in the present invention. The CCDs 21, 22, and 23 composes a "photo detection means" in the present invention. The shutters 31, 32, and 33 compose an "intensity modulating means" and a "shutter means" in the present invention.

The optical image measuring apparatus 1 further includes a pulse signal generator 50 and phase shifters 41, 42, and 43. The pulse signal generator 50 generates a pulse signal. The phase shifters 41, 42, and 43 each shift a phase of the pulse signal generated by the pulse signal generator 50 to produce timing signals for separately controlling open-and-close timings of the respective shutters 31, 32, and 33.

Figure 2:
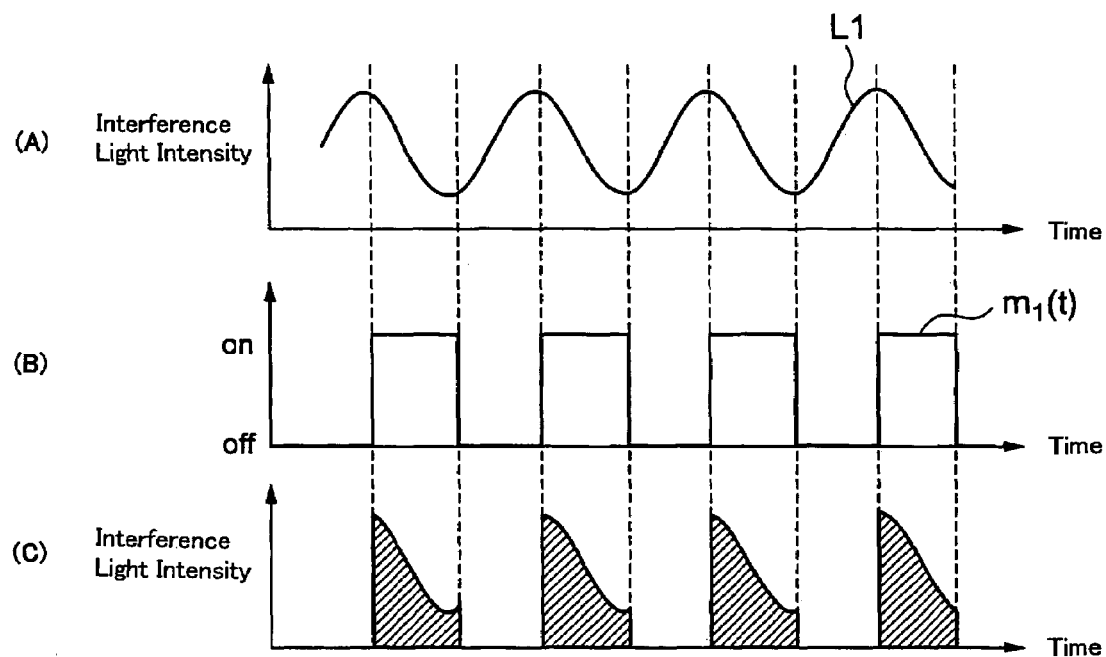

The respective shutters 31, 32, and 33 periodically cut off the interference light beams L1, L2, and L3, respectively, in response to the timing signals from the phase shifters 41, 42, and 43 at predetermined frequencies in order to sample the respective interference light beams. Therefore, the respective CCDs 21, 22, and 23 periodically receive the corresponding interference light beams L1, L2, and L3. As shown in FIG. 2C later, each of the interference light beams is received as a periodic pulse train. At this time, the respective shutters 31, 32, and 33 are separately opened and closed, so the pulses of the interference light beams L1, L2, and L3 detected by the CCDs 21, 22, and 23 have predetermined phase differences. The CCDs 21, 22, and 23 perform photoelectric conversion on the interference light beams L1, L2, and L3 which are detected at each pixel and output heterodyne signals which are results obtained by the conversion to a signal processing portion 60. Each of the heterodyne signals is an electrical signal reflecting the intensity and phase of the detected interference light beam.

The signal processing portion 60 is a "calculating means" in the present invention, which executes calculation processing described later based on the heterodyne signals outputted from the CCDs 21, 22, and 23. The signal processing portion 60 also analyzes a result obtained by the calculation processing, forms various images including a two-dimensional sectional image of the object to be measured O based on the analyzed result, and causes a display device such as a monitor device which is not shown to display the images. The signal processing portion 60 is composed of, for example, a computer which includes a storage device storing a predetermined calculation program, such as a ROM, and a CPU executing the calculation program.

A beam diameter of a light beam emitted from the light source 2 is increased by the lenses 3 and 4. The light beam is divided into the signal light S and the reference light R by the beam splitter 5. The signal light S is incident on the object to be measured O and then incident on the beam splitter 5 again as a reflection light wave including information related to a surface form and inner form of the object to be measured O.

On the other hand, the reference light R passes through the frequency shifter 6 to be subjected to frequency shift, and then propagates to the mirror 7 and is reflected thereon. The reflected reference light R passes through the frequency shifter 6 again to be subjected to additional frequency shift and is incident on the beam splitter 5 again. As described above, the frequency of the reference light R may be shifted by z-scanning of the mirror 7.

A part of the signal light S from the object to be measured O is reflected on the beam splitter 5. Simultaneously, a part of the reference light R subjected to the frequency shift transmits through the beam splitter S. Therefore, the signal light S and the reference light R are superimposed on each other by the beam splitter 5 to produce the interference light L. The interference light L passes through the imaging lens group 8 and propagates to the beam splitter 11.

An optical path of the interference light L is divided into two by the beam splitter 11. The interference light beam L1 reflected on the beam splitter 11 is detected by the CCD 21 through the shutter 31.

An optical path of interference light transmitting through the beam splitter 11 is further divided into two by the beam splitter 12. The interference light beam L2 reflected on the beam splitter 12 is detected by the CCD 22 through the shutter 32.

On the other hand, the interference light beam L3 transmitting through the beam splitter 12 is detected by the CCD 23 through the shutter 33.

It is desirable that an interference light dividing ratio of the beam splitter 11, that is, an intensity ratio of the transmitted interference light to the reflected interference light beam L1 be 2:1. In other words, it is desirable that the beam splitter 11 transmit ⅔ of the incident light and reflect ⅓ thereof. In addition, it is desirable that an intensity ratio of the interference light beam L3 transmitting through the beam splitter 12 to the interference light beam L2 reflected thereon be 1:1. In other words, it is desirable that the beam splitter 12 transmit ½ of the incident light and reflect ½ thereof. Therefore, intensity levels of the interference light beams L1, L2, and L3 detected by the CCDs 21, 22, and 23 are made equal to one another, so this is suitable for performing calculation processing described later. An intensity ratio between the divided interference light beams is not limited to those and thus can be set as appropriate.

[Measurement Mode]

Subsequently, a measurement mode with respect to the direct current component of the heterodyne signal corresponding to the background light of the interference light L, the signal intensity of the interference light L (that is, the heterodyne signal), and the spatial phase distribution thereof, which are obtained by the optical image measuring apparatus 1 will be described. In the optical image measuring apparatus 1, the interference light beams L1, L2, and L3 for which predetermined phase differences are provided according to the open-and-close timings of the shutters 31, 32, and 33 are sampled for detection. Therefore, the intensity of the direct current component composed of the background light, the signal intensity of the interference light L, and the spatial phase distribution thereof are obtained by one-time measurement without a time difference.

Note that sampling functions (described later) for controlling the open-and-close timings of the shutters 31, 32, and 33 are set in advance. The phases of the pulses periodically generated by the pulse signal generator 50 are shifted by the phase shifters 41, 42, and 43 and the phase-shifted pulses are respectively outputted to the shutters 31, 32, and 33 to produce the sampling functions.

FIGS. 2A to 2C are explanatory diagrams showing sampling operation of the interference light beam L1 which is performed by the shutter 31. FIG. 2A shows a time waveform of the interference light beam L1 received by the CCD 21. As expressed by the expression (1), a heterodyne signal related to the interference light beam L1 can be expected to be a signal in which a direct current component composed of the background light proportional to the intensity of the reference light R and the intensity of the signal light S is superimposed on an alternating current component having a beat frequency of the interference light beam L1 (which is called a beat signal or the like).

Therefore, the interference light beam L1 is sampled by periodically opening and closing (switching on and off) the shutter 31 based on a sampling function $m_1(t)$ shown in FIG. 2B. The sampling function $m_1(t)$ has a waveform composed of, for example, a rectangular train with a duty of 50% and its frequency $f_{sm}$ is set to a value equal to the beat frequency $f_{if}$ indicated in the expression (1) or close to the beat frequency (that is, $f_{sm}=f_{if}$ or $f_{sm} \approx f_{if}$).

FIG. 2C schematically shows a time waveform of the interference light beam L1 which is allowed to enter the CCD 21 when the interference light beam L1 is sampled using the sampling function $m_1(t)$. A difference between the frequency $f_{sm}$ of the sampling function $m_1(t)$ and the beat frequency $f_{if}$ of the heterodyne signal which is indicated in the expression (1) ($\delta f=|f_{if}-f_{sm}|$) is set to a value sufficiently smaller than a response frequency of the CCD 21 serving as the storage type photo sensor. Therefore, a part of the interference light beam L1 having substantially the same phase is sampled during each period thereof. At this time, an output $i_1(t)$ from the CCD 21 that receives the interference light beam L1 is proportional to the amount of photocharge stored in the CCD 21 during a measurement period. More specifically, the output $i_1(t)$ is expressed by the following expression (for example, see M. Akiba, K. P. Chan, and N. Tanno, Optics Letters, Vol. 28, 816 (2003)).

$$i_1(t) = \langle K_1 i(t) m_1(t) \rangle \qquad (2)$$

$$= K_1 \left[ \frac{1}{2} I_s + \frac{1}{2} I_r + \frac{2}{\pi} \sqrt{I_s I_r} \cos(2\pi \delta f t + \phi) \right]$$

Here, <-> indicates a time average produced by a storage effect of the CCD 21. In addition, $\phi$ indicates an initial phase value for measurement and $K_1$ indicates photo detection efficiency including reflectance of the beam splitter 11 and a photoelectric conversion rate of the CCD 21.

Similarly, the interference light beam L2 is sampled by the shutter 32 whose open-and-close timings are controlled based on a predetermined sampling function $m_2(t)$, and is then detected by the CCD 22. The sampling function $m_2(t)$ has a waveform of a rectangular train with a duty of 50% and a frequency $f_{sm}$ thereof is equal to that of the sampling function $m_1(t)$ for sampling the interference light beam L1. The sampling function $m_2(t)$ has a phase difference $\Delta\theta_{1,2}$ with the sampling function $m_1(t)$. The phase difference $\Delta\theta_{1,2}$ is provided by setting phase shift amounts produced by the phase shifters 41 and 42 in advance. Under the above-mentioned condition, the following output $i_2(t)$ is obtained from the CCD 22 based on the same fundamentals as the expression (2).

$$i_2 = K_2 \left[ \frac{1}{2} I_s + \frac{1}{2} I_r + \frac{2}{\pi} \sqrt{I_s I_r} \cos(2\pi \delta f t + \phi + \Delta\theta_{1,2}) \right] \qquad (3)$$

Here, $K_2$ indicates photo detection efficiency including transmittance of the beam splitter 11, reflectance of the beam splitter 12, and a photoelectric conversion rate of the CCD 22.

As is apparent from the expressions (2) and (3), each of the outputs from the CCDs 21 and 22 includes the term of an intensity $I_s$ of the signal light S and the term of an intensity $I_r$ of the reference light R. In addition, the output from the CCD 21 includes the term related to an amplitude $\sqrt{I_s I_r}$ of the interference light beam L1 and a phase $(2\pi\delta f t+\phi)$ thereof. The output from the CCD 22 includes the term related to an amplitude $\sqrt{I_s I_r}$ of the interference light beam L2 and a phase $(2\pi\delta f t+\Delta\theta_{1,2})$ thereof.

The interference light beam L3 is sampled by the shutter 33 whose open-and-close timings are controlled based on a sampling function $m_3(t)$, and is then detected by the CCD 23. The sampling function $m_3(t)$ has a waveform of a rectangular train with a duty of 50% and a frequency $f_{sm}$ thereof is equal to that of the sampling function $m_1(t)$ for sampling the interference light beam L1. The sampling function $m_3(t)$ has a phase difference $\Delta\theta_{1,3}$ with the sampling function $m_1(t)$. The phase difference $\Delta\theta_{1,3}$ is provided by setting phase shift amounts produced by the phase shifters 41 and 43 in advance. In this time, the following output $i_3(t)$ is obtained from the CCD 23 based on the same fundamentals as the expression (2).

$$i_3 = K_3 \left[ \frac{1}{2} I_s + \frac{1}{2} I_r + \frac{2}{\pi} \sqrt{I_s I_r} \cos(2\pi \delta f t + \phi + \Delta\theta_{1,3}) \right] \qquad (4)$$

Here, $K_3$ indicates photo detection efficiency including respective transmittances of the beam splitter 11 and 12 and a photoelectric conversion rate of the CCD 23.

[Calculation Processing]

Electrical signals outputted from the CCDs 21, 22, and 23 as expressed by the expressions (2), (3), and (4) are transmitted to the signal processing portion 60. The signal processing portion 60 executes the calculation as described below using results outputted from the CCDs 21, 22, and 23. Therefore, the direct current component of the heterodyne signal which corresponds to the background light of the interference light L and is expressed by the expression (1), the signal intensity of, the interference light L, that is, the heterodyne signal, and the spatial phase distribution thereof are calculated.

Here, the phase difference $\Delta\theta_{1,2}$ between the sampling function $m_1(t)$ and the sampling function $m_2(t)$ is set to $-\pi/2$. The phase difference $\Delta\theta_{1,3}$ between the sampling function $m_1(t)$ and the sampling function $m_3(t)$ is set to $\pi/2$. In this time, an intensity $S_1$ of the direction current component of the heterodyne signal which is composed of the background light of the interference light L and phase quadrature components (sine component and cosine component) $S_2$ and $S_3$ thereof are expressed by the following respective expressions.

$$S_1 = \frac{i_2}{K_2} + \frac{i_3}{K_3} = I_s + I_r \quad (5)$$

Therefore, the intensity of the direct current component corresponding to the background light of the interference light L can be calculated based on the electrical signals from the two CCDs 22 and 23 of the three CCDs 21, 22 and 23.

$$S_2 = \frac{i_2}{K_2} - \frac{i_3}{K_3} = \frac{4}{\pi}\sqrt{I_s I_r}\sin(2\pi\delta ft + \phi) \quad (6)$$

$$S_3 = \frac{2i_1}{K_1} - S_1 = \frac{4}{\pi}\sqrt{I_s I_r}\cos(2\pi\delta ft + \phi) \quad (7)$$

When the expressions (6) and (7) are used, the amplitude of the heterodyne signal expressed by the expression (1) is expressed by the following expression.

$$\sqrt{I_s I_r} \propto \sqrt{S_2^2 + S_3^2} \quad (8)$$

Here, a proportionality factor related to the right side is π/4. The amplitude of the heterodyne signal can be calculated using the direct current component obtained by the expression (5). Therefore, when the direct current component is added to the amplitude of the heterodyne signal, the intensity of the heterodyne signal, that is, the intensity of the interference light L can be obtained.

This indicates that the optical image measuring apparatus 1 is effective for image measurement in which the intensity of the background light is hard to measure in advance, such as optical sectional image measurement for a moving object. It is unnecessary to separately measure the intensity of the direct current component composed of the background light, so a measurement process can be simplified. Thus, measurement trouble is reduced to shorten a measurement time.

According to the optical image measuring apparatus 1, the spatial phase distribution of the interference light L can be obtained for imaging by the following measurement method.

When the interference components $S_2(t_1)$ and $S_3(t_1)$ of the heterodyne signal which are expressed by the expressions (6) and (7) are obtained at a measurement time t=$t_1$, a signal as expressed by the following expression is calculated from a ratio between both the interference components.

$$S_4 = \frac{S_2(t_1)}{S_3(t_1)} = \tan(2\pi\delta ft_1 + \phi) \quad (9)$$

As is apparent from the expression (9), a signal $S_4$ does not depend on the amplitude of the interference light L and includes only phase information thereof. Therefore, a phase φ (x, y, $t_1$) of the heterodyne signal which is outputted from each of pixels of the CCDs 21, 22, and 23, each of which is the two-dimensional photo sensor array, is expressed by the following expression. Here, (x, y) indicate positional coordinates of each of the pixels which are set on the CCDs.

$$\phi(x, y, t_1) = \tan^{-1}\left[\frac{S_2(x, y, t_1)}{S_3(x, y, t_1)}\right] - 2\pi\delta ft_1 \quad (10)$$

It can be assumed that the second term $2\pi\delta ft_1$ of the expression (10) is an instantaneous phase value of an alternating current signal having a frequency δf of zero or substantially zero at the measurement time $t_1$ and kept constant regardless of a position (that is, variables x, y) of a pixel of each of the CCDs 21, 22, and 23. Therefore, when a difference between a phase φ ($x_1$, $y_1$, $t_1$) of a heterodyne signal detected from a pixel located at coordinates (x=$x_1$, y=$y_1$) on each of the CCDs 21, 22, and 23 and a phase of a heterodyne signal detected from each of the pixels are obtained, a spatial phase distribution of the heterodyne signals, that is, a spatial phase distribution of the interference light L can be imaged. It is expected that such measurement of the spatial phase distribution of the interference light is effective for image measurement using phase difference values as references, such as high precision measurement on a mirror surface, which is performed by a heterodyne interference method.

When the phase information is used, frequency information of the interference light L can be obtained. That is, a phase difference δf between the frequency $f_{if}$ of the heterodyne signal and the sampling frequency $f_{sm}$ is calculated by the following expression based on phases φ (x, y, $t_1$) and φ (x, y, $t_2$) obtained by calculation at two measurement times t=$t_1$ and t=$t_2$.

$$\delta f = \frac{1}{2\pi}\left|\frac{\phi(x, y, t_1) - \phi(x, y, t_2)}{t_1 - t_2}\right| \quad (11)$$

Because the sampling frequency $f_{sm}$ is known, the frequency $f_{if}$ of the heterodyne signal, that is, the frequency of the interference light L can be calculated based on a result calculated from the expression (11). It is expected that the heterodyne frequency measuring method is effectively usable for Doppler velocity measurement using a heterodyne interference method, such as blood flow measurement on a fundus of an eye to be examined.

In the optical image measuring apparatus 1 according to this embodiment, each of the shutters 31, 32, and 33 such as the high-speed shutters is used as the intensity modulating means in the present invention. However, the intensity modulating means is not limited to this. For example, a spatial light modulator (SLM) whose transmittance for transmitting the interference light can be periodically changed is provided instead of such a shutter means that completely cuts off the interference light. Therefore, the intensity of the interference light received by a photo detection means such as the CCD can be modulated to sample the interference light. That is, the shutter means changes the intensity of the interference light received by the photo detection means between 0 and 100 (maximal intensity). A structure for periodically changing the intensity of the interference light between, for example, 10 and 80 can be applied as the intensity modulating means in the present invention.

In addition to changing of the modulated intensity of the interference between the two values, it is possible to employ a method of periodically switching among at least three values or a method of periodically and successively switching between two values based on a sampling mode or the like. An interval for intensity modulation may be determined in view of the sensitivity of the CCD, or the like. If the intensity of the interference light can be periodically modulated, any structure may be employed as the intensity modulating means in the present invention. It is also possible to integrally form the intensity modulating means and the photo detection means.

An arbitrary type beam splitter can be used as each of the beam splitters 5, 11, and 12. When a cube type beam splitter is used, reflection light on a boundary surface with air is likely to be incident on a CCD. Therefore, it is preferable to use a plate type beam splitter, a wedge type beam splitter, or the like.

In the optical image measuring apparatus 1, the optical system in which the optical path of the illumination system in which the lenses 3 and 4 are disposed is separated from the optical path of the detection system in which the imaging lens group 8 and the like are disposed is used to eliminate the influences of reflected light from the optical elements located on the respective optical paths.

The three separate CCDs 21, 22, and 23 are provided in the optical image measuring apparatus 1. For example, a three-chip CCD camera (unit) such as a 3-CCD type color CCD camera may be used and the intensity modulating means may be disposed in front of each of the CCD chips to construct an apparently single CCD camera. Therefore, it is possible to achieve the simplification of an apparatus structure, and the inner space saving of the apparatus, and the like.

When a light receiving surface of a single CCD is divided into a plurality of regions and the intensity modulating means is disposed in front of each of the regions, it is also possible to detect the interference light using each of the regions of the CCD as a single CCD. In this time, a single intensity modulating means composed of, for example, a liquid SLM having a size necessary to cover the plurality of regions of the CCD may be disposed and a region of the intensity modulating means corresponding to each of the regions of the CCD may be controlled to detect the interference light. According to such a structure, it is possible to achieve the simplification of an apparatus structure, and the inner space saving of the apparatus. In addition, it is unnecessary to perform sampling with synchronous control of a plurality of CCDs, so a control system can be simplified.

Offset adjustment of a direct current component of a charge stored in the CCD and gain adjustment of an alternating current signal may be suitably performed to improve the contrast of interference fringes produced by the detected interference light.

When a return mirror for two-time reflection or a corner cube is applied as the reference object, a moving distance of the reference object at z-scanning can be shortened. Therefore, the inner space saving of the apparatus can be achieved. In addition, it is possible to reduce the load on the drive device for moving the reference object and the power consumption thereof.

[Modified Examples of Mode for Obtaining Direct Current Component Corresponding to Background Light]

In the above-mentioned embodiment, the method is employed in which the phase difference $\Delta\theta_{1,2}$ between the sampling function $m_1(t)$ and the sampling function $m_2(t)$ and the phase difference $\Delta\theta_{1,3}$ between the sampling function $m_1(t)$ and the sampling function $m_3(t)$ are set to $-\pi/2$ and $\pi/2$, respectively, to obtain the direct current component corresponding to the background light. However, a mode for obtaining the direct current component is not limited to this method. Hereinafter, examples of another mode for obtaining the direct current component will be described. According to modified examples of the mode, the degree of freedom of a structure for obtaining the direct current component is increased, with the result that the usefulness of the apparatus is improved.

(First Modified Example of Mode for Obtaining Direct Current Component)

Figure 3:
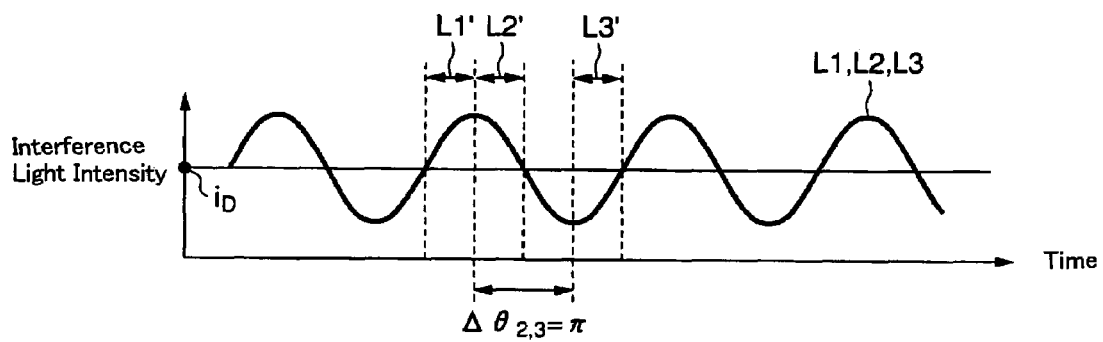
FIG. 3 is an explanatory graph showing a modified example of the optical image measuring apparatus according to the embodiment of the present invention.

First, a method of calculating the direct current component based on the electrical signals outputted from the two CCDs as in the above-mentioned embodiment will be described with reference to FIG. 3. Here, a structure including the CCDs 22 and 23 shown in FIG. 1 is used. However, even in an optical image measuring apparatus including only two CCDs and an optical image measuring apparatus including four or more CCDs, the same calculation processing can be performed.

Therefore, the phase difference $\Delta\theta_{2,3}$ between the sampling function $m_2(t)$ and the sampling function $m_3(t)$ is set to $\pi$ (180 degrees). For example, as shown in FIG. 3, a sampling range L1' of the interference light beam L1 sampled based on the sampling function $m_1(t)$ is set to 0 to $\pi/4$. A sampling range L2' of the interference light beam L2 sampled based on the sampling function $m_2(t)$ is set to $\pi/4$ to $\pi/2$. A sampling range L3' of the interference light beam L3 sampled based on the sampling function $m_3(t)$ is set to $3\pi/4$ to $2\pi$. In this time, the phase difference $\Delta\theta_{1,2}$ between the sampling function $m_1(t)$ and the sampling function $m_2(t)$ is $\pi/4$ and the phase difference $\Delta\theta_{1,3}$ between the sampling function $m_1(t)$ and the sampling function $m_3(t)$ is $3\pi/4$. Assume that each of the sampling functions $m_1(t)$, $m_2(t)$, and $m_3(t)$ has a frequency equal to the beat frequency and a duty ratio of each of the sampling functions $m_1(t)$, $m_2(t)$, and $m_3(t)$ is 25%.

In such sampling, the signal processing portion 60 time-averages respective electrical signals outputted from the CCDs 22 and 23 to calculate a direct current component corresponding to the background light of the interference light L. That is, because the phase difference $\Delta\theta_{2,3}$ between a sampling range L2' of the interference light beam L2 and the sampling range L3' of the interference light beam L3 is $\pi$, when the electrical signals are time-averaged, an alternating current component is canceled to extract only a direct current component $i_D$. Then, an intensity of a target direct current component is obtained based on the direct current component $i_D$. Note that the above-mentioned embodiment in which the phase difference $\Delta\theta_{1,2}$ is set to $-\pi/2$ and the phase difference $\Delta\theta_{1,3}$ is set to $\pi/2$ corresponds to this case.

Here, "time averaging of an electrical signal" means processing for averaging a light receiving quantity indicated by the electrical signal from the CCD (photo detection means) with, for example, a time required for the CCD to obtain one frame image. Assume that "time averaging" of a plurality of electrical signals means processing for obtaining time averaging values of the respective electrical signals and calculating an average value of the obtained time averaging values. The "time" in the processing for time averaging is not limited to a time corresponding to one frame. Therefore, for example, a desirable constant time such as a sampling period can be used.

As described above, when the phase difference between the respective interference light beams received by the two CCDs is set to $\pi$ and the respective electrical signals outputted from the two CCDs are time-averaged, it is possible to calculate the direct current component corresponding to the background light of the interference light L. According to such a method, when the phase difference between the two interference light beams sampled is $\pi$, start and end timings of each sampling can be arbitrarily set.

Therefore, the degree of freedom of the measurement mode for obtaining the direct current component is improved.

The direct current component can be similarly obtained from electrical signals corresponding to three or more interference light beams sampled such that each of phase differences becomes π.

(Second Modified Example of Mode for obtaining Direct Current Component)

Figure 4:
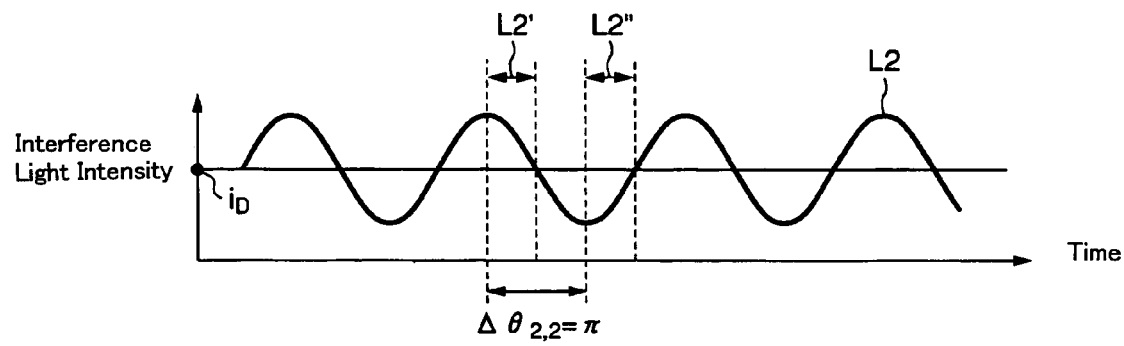
FIG. 4 is an explanatory graph showing a modified example of the optical image measuring apparatus according to the embodiment of the present invention.

Next, a method of calculating the direct current component based on an electrical signal outputted from a single CCD will be described. FIG. 4 shows a sampling mode for this method. Here, a structure including the CCD 22 of the optical image measuring apparatus 1 shown in FIG. 1 is used. However, even in an optical image measuring apparatus including only a single CCD and an optical image measuring apparatus including an arbitrary number of CCDs, the direct current component can be similarly obtained.

In this modified example, measurement is performed plural times using the CCD 22. The direct current component is calculated based on electrical signals from the CCDs 22 during the plural-time measurement. Therefore, sampling of an interference light beam L2 is performed plural times (for example, twice) such that a phase difference $\Delta\theta_{2,2}$ becomes π. For example, two sampling functions for sampling the interference light beam L2 are given by $m_2(t)$ and $n_2(t)$. As shown in FIG. 4, the sampling range L2' of the interference light beam L2 sampled based on the sampling function $m_2(t)$ is set to π/4 to π/2. A sampling range L2" of the interference light beam L2 sampled based on the sampling function $n_2(t)$ is set to 3π/4 to 2π. Assume that each of the sampling functions $m_2(t)$ and $n_2(t)$ has a frequency equal to the beat frequency and a duty ratio of each of the sampling functions $m_2(t)$ and $n_2(t)$ is 25%.

In such sampling, the signal processing portion 60 time-averages two electrical signals outputted from the CCD 22 to calculate a direct current component corresponding to the background light of the interference light L. That is, because the phase difference $\Delta\theta_{2,2}$ between the sampling ranges L2' and L2" of the interference light beam L2 is π, when the electrical signals are time-averaged, an alternating current component is canceled to extract only the direct current component $i_D$. Then, an intensity of the direct current component is obtained based on the direct current component $i_D$.

As described above, the interference light beam on the same optical path is sampled twice such that a phase difference between respective samples becomes π. The respective electrical signals outputted from the single CCD located on the optical path are time-averaged. Therefore, it is possible to calculate the direct current component corresponding to the background light of the interference light L. According to such a method, when the phase difference between samples in the case where the interference light beam is sampled twice is π, start and end timings of each sampling can be arbitrarily set. Thus, the degree of freedom of the measurement mode for obtaining the direct current component is improved. Even in the optical image measuring apparatus including only the single CCD, the direct current component can be effectively measured.

The direct current component can be similarly calculated from electrical signals corresponding to samples obtained by sampling the interference light beam three times or more such that each of phase differences becomes π. For example, the direct current component can be obtained based on electrical signals outputted from the CCD when sampling is performed at a frequency which is 2n times as high as the beat frequency. When sampling is to be performed plural times according to the beat frequency during a storage period of the CCD, electrical signals outputted from the CCD during sampling become signals indicating an intensity of the direct current component. Therefore, the intensity of the direct current component may be obtained from the signals.

(Third Modified Example of Mode for Obtaining Direct Current Component)

A third modified example of a mode for obtaining the direct current component composed of the background light will be described. In this modified example, only a single CCD (for example, the CCD 22) is used as in the second modified example. Therefore, a frequency of the sampling function $m_2(t)$ is set to a value which is not synchronized with the frequency of the heterodyne signal (beat frequency) $f_{if}$. According to such setting, parts of the interference light beam which have different phases are successively sampled, with the result that (substantially) the entire phase range 0 to 2π of the interference light beam is sampled. Thus, when sampling results are time-averaged, the alternating current component is canceled to extract only the direct current component.

Figure 5:
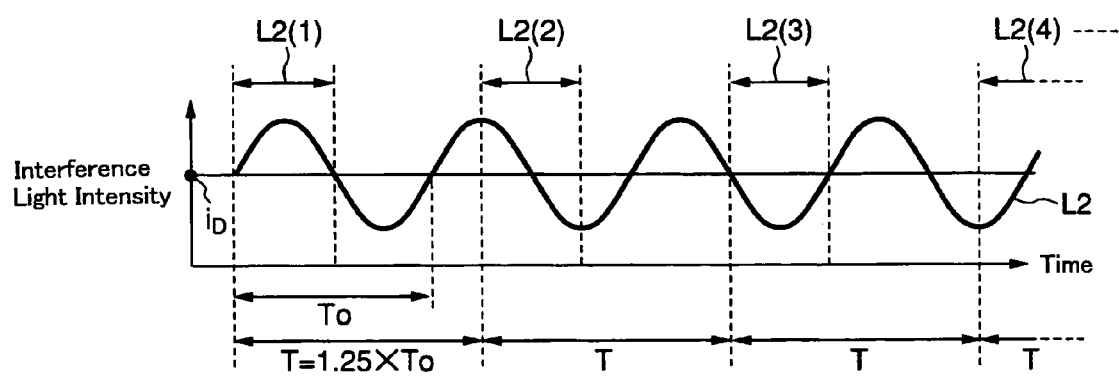
FIG. 5 is an explanatory graph showing a modified example of the optical image measuring apparatus according to the embodiment of the present invention.

An example of this modified example will be described with reference to FIG. 5. Assume that a period $T_0$ of the heterodyne signal is expressed by $1/f_{if}$ and a sampling period T is expressed by 1/f. A duty ratio of sampling is set to 40%. When a sampling frequency f is set to a value 0.8 time as high as the beat frequency $f_{if}$ (f=0.8×$f_{if}$), the sampling period T becomes 1.25 times as long as the period $T_0$ of the heterodyne signal (T=1.25×$T_0$). In this time, a first sampling range L2 (1) corresponds to a phase range 0 to π of the interference light beam L2, a second sampling range L2(2) corresponds to a phase range π/2 to 3π/2 thereof, a third sampling range L2(3) corresponds to a phase range π to 2π thereof, and a fourth sampling range L2(4) corresponds to a phase range 3π/2 to π/2 thereof (same as above). According such sampling, the interference light beam L2 is sampled in a phase range of 0 to 2π. Thus, when sampling results are time-averaged, the alternating current component is canceled to extract only the direct current component $i_D$.

It is not preferable to set a value which is an integral multiple of the period $T_0$ of the heterodyne signal as a value of the sampling period T. This reason is as follows. That is, in the case of T=n×$T_0$ (n is an integer), the interference light beam L2 is sampled in the same phase range once every n-periods. Therefore, even when time averaging is performed, the alternating current component cannot be cancelled. However, when the duty ratio is set to, for example, k/n (k is an integer equal to or smaller than n), each of k-periods of the interference light beam L2 becomes a sampling range. Thus, such a case can be applied.

(Fourth Modified Example of Mode for Obtaining Direct Current Component)

Figure 6:
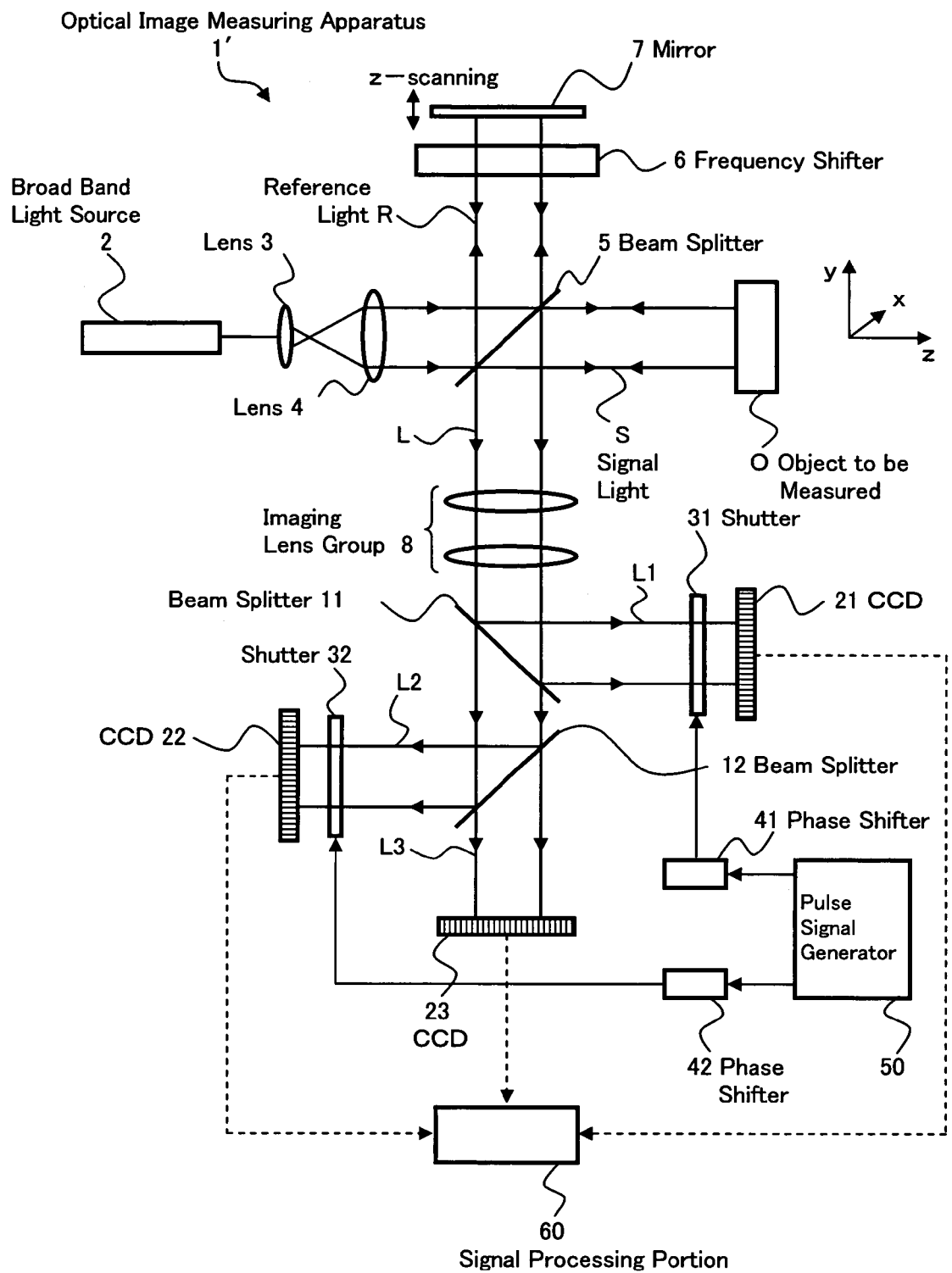
FIG. 6 is a schematic diagram showing a modified example of an optical image measuring apparatus according to the embodiment of the present invention.

Next, when a structure of an optical image measuring apparatus 1' as shown in FIG. 6 is employed, the direct current component can be obtained by the following fourth modified example. The optical image measuring apparatus 1' shown in FIG. 6 has the same structure as that of the optical image measuring apparatus 1 shown in FIG. 1 except that the intensity modulating means (shutter 33) is not disposed in front of the CCD 23.

When the CCDs 21 and 22 receive the sampled interference light beams L1 and L2, respectively, the CCD 23 of the optical image measuring apparatus 1' successively receives the interference light beam L3, converts the received interference light beam into an electrical signal, and outputs the electrical signal to the signal processing portion 60. The signal processing portion 60 can calculate a time average value of successive electrical signals from the CCD 23 to extract only the direct current component of the interference light. That is, because the successively received interference light beam L3 is a random signal, when time averaging is performed, the alternating current component is canceled to effectively extract only the direct current component. Note that the alternating current component can be obtained based on the electrical signals from the CCDs 21 and 22 by using, for example, the method described in JP 2001-330558 A made by the inventors of the present invention. As described above, when the electrical signals from the photo detection means disposed on the optical path in which the intensity modulating means is not provided are subjected to averaging, it is also possible to obtain the direct current component composed of the background light of the interference light.

According to the optical image measuring apparatus 1', the direct current component composed of the background light of the interference light and the alternating current component thereof can be obtained without a time lag, so the convenience of the apparatus such as the shortening of a measurement time is improved. The number of intensity modulating means necessary to construct the apparatus is two. Therefore, it is possible to achieve the simplification of the structure, a reduction in cost, and the inner space saving of the apparatus. The two CCDs and the two intensity modulating means may be synchronously controlled, with the result that the simplification of control is achieved. The alternating current component can be calculated based on the result obtained from the two interference light beams received through the intensity modulating means, so a calculation time can be also expected to be shortened.

In the structure shown in FIG. 6, the CCD 23 is a specific photo detection means for obtaining the intensity of the background light. The intensity modulating means is not provided in front of the CCD 23. When this structure is applied, the interference light beam L3 may be weak. For example, the quantity of interference light beam L3 incident on the CCD 23 may be set to about several % of the interference light L. This is because the calculation may be performed after a gain of the electrical signal from the CCD 23 is adjusted by the signal processing portion 60. Therefore, when the structure is employed, it is unnecessary to limit the interference light intensity dividing ratio of the beam splitter 12 to 1:1. According to the structure shown in FIG. 6, the transmittance of the beam splitter 12 can be set to a value smaller than the reflectance thereof.

(Fifth Modified Example of Mode for Obtaining Direct Current Component)

A modified example will be described in which a direct current component corresponding to the background light of the interference light can be successively calculated by controlling the sampling operation of the intensity modulating means such that a light receiving time of an interference light beam received by the photo detection means is changed, for example, at intervals.

Figure 7:
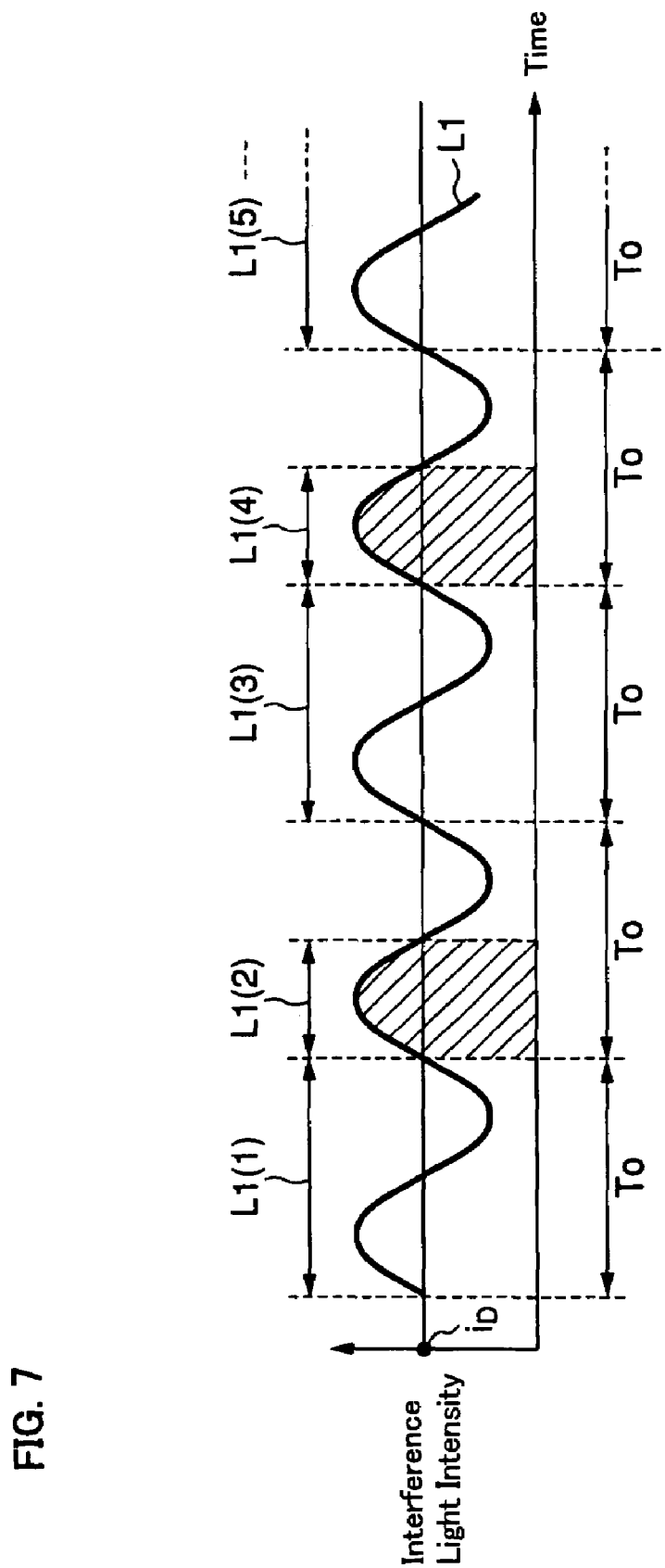
FIG. 7 is an explanatory graph showing a modified example of the optical image measuring apparatus according to the embodiment of the present invention.
Figure 8:
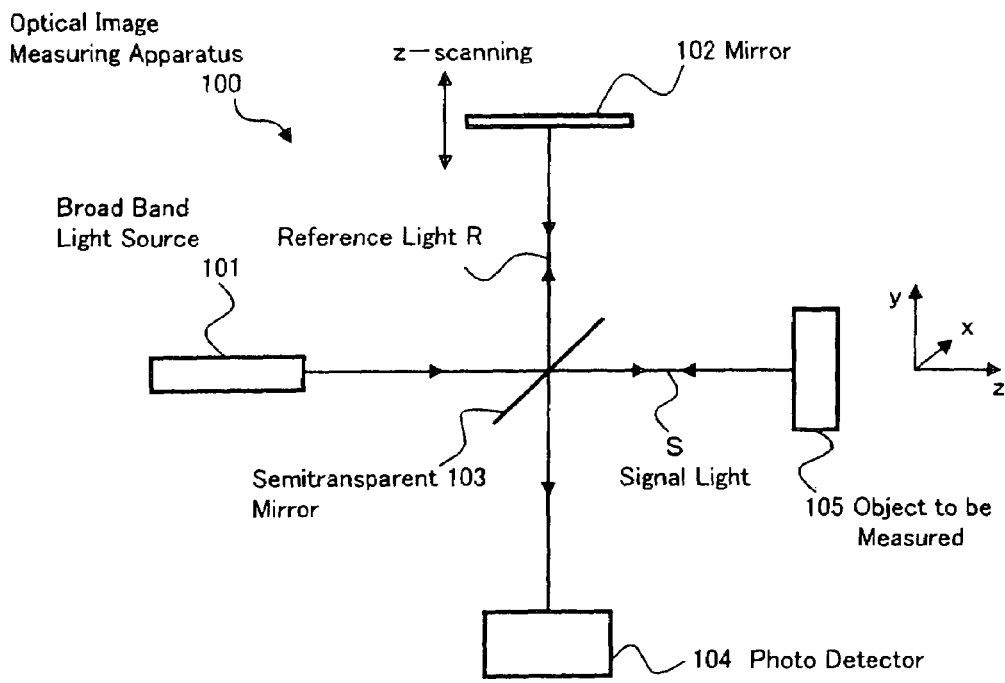
FIG. 8 is a schematic diagram showing a conventional optical image measuring apparatus.
Figure 9:
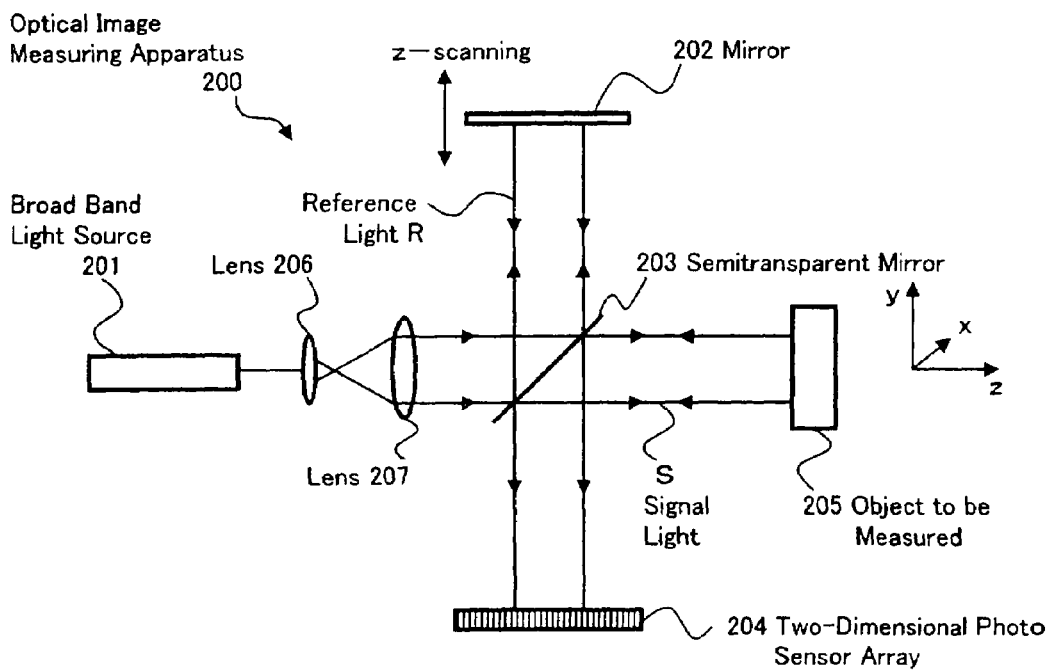
FIG. 9 is a schematic diagram showing a conventional optical image measuring apparatus.

FIG. 7 shows a sampling mode in this modified example. In this modified example, the interference light beam L1 is sampled by the shutter 31. A sampling period is synchronized with the period $T_0$ of the heterodyne signal. The shutter 31 composes a light receiving time changing means in the present invention. Assume that, for example, a first sampling range is L1(1) corresponding to one period, a second sampling range is L1(2) corresponding to a half period, a third sampling range is L1(3) corresponding to one period, and a fourth sampling range is L1(4) corresponding to a half period. That is, a sampling function in this modified example has, for example, a rectangular waveform in which a duty ratio is alternately changed between 100% and 50%.

When sampling is performed based on such a sampling function, the interference light beam L1 in the sampling ranges L1(1), L1(3), L1(5), . . . , each of which has a phase of 0 to $2\pi$, and the interference light beam L1 in the sampling ranges L1(2), L1(4), L1(6), . . . , each of which has a phase of 0 to $\pi$, are alternately received by the CCD 21. In this time, a ratio of the light receiving time of the CCD 21 between the odd-number-th sampling range and even-number-th sampling range of the interference light beam L1 becomes 2:1. The CCD 21 successively transmits electrical signals corresponding to the received interference light beams in the respective sampling ranges to the signal processing portion 60.

The signal processing portion 60 calculates a time average value of the electrical signals corresponding to the odd-number-th sampling ranges L1(1), L1(3), L1(5), . . . to obtain the intensity $i_D$ of the direct current component composed of the background light of the interference light. This is based on the fact that the alternating current component is canceled to extract only the direct current component when time averaging is performed because each of the odd-number-th sampling ranges corresponds to the phase of 0 to $2\pi$, that is, one period.

The signal processing portion 60 calculates the amplitude and phase of the alternating current component based on an electrical signal corresponding to an even-number-th sampling range from the CCD 21, electrical signals outputted from the CCD 22 and/or the CCD 23 in synchronization with the electrical signal from the CCD 21, and an intensity of a direct current component calculated from an electrical signal corresponding to the odd-number-th sampling range immediately before the even-number-th sampling range.

In this modified example, the direct current component and the alternating current component are successively and alternately calculated. Therefore, when measurement is performed while a depth of the object to be measured O is changed by, for example, z-scanning, an intensity of a direct current component (substantially) corresponding to each depth can be successively calculated and an alternating current component can be obtained based on a result obtained by calculation. Thus, the measurement precision of the object to be measured O is improved for each depth.

When the alternating current component is calculated based on the output signals from the three CCDs, it is possible to use, for example, the calculation method described in the above-mentioned embodiment. When the alternating current component is calculated based on the output signals from the two CCDs, it is possible to use, for example, the method described in JP 2001-330558 A.

It is unnecessary to perform sampling for calculating the direct current component every one period. The sampling can be performed at arbitrary timing, for example, every two periods or every three periods. In addition, it is unnecessary to periodically perform the sampling for calculating the direct current component. A sampling interval may be changed. For example, first sampling is performed every one period and next sampling is performed every two periods.

The intensity modulating means such as an SLM other than the shutter means for completely cutting off the interference light beam can be used as the light receiving time changing means.

As described above, in this modified example, the light receiving time of the interference light beam received by the photo detection means is adjusted. The direct current component is obtained based on the electrical signals outputted from the photo detection means when the light receiving time is long (first light receiving time). The alternating current component is obtained based on the electrical signals outputted from the photo detection means when the light receiving time is short (second light receiving time) and the obtained direct current component. In order to cancel the alternating current component by averaging, it is preferable that the first light receiving time be a time equal to or longer than a beat period of the interference light beam (for example, an integral multiple of the beat period) or a time equal to the beat period. In addition, it is preferable that the second light receiving time be a time shorter than the beat period of the interference light beam or a time equal to half of the beat period. That is, a duty ratio of sampling for obtaining the alternating current component is set to 50% because the measurement can be effectively performed.

[Modified Example of Sampling Mode]

An example of a sampling mode which can be applied to the optical image measuring apparatus according to the present invention will be described. In particular, modified examples with respect to the sampling frequency, the duty ratio, the waveform of the sampling function, and the like will be described. According to the following modified examples, the degree of freedom of the sampling mode is increased, with the result that the usefulness of the apparatus is improved.

(With Respect to Sampling Frequency)

In the above-mentioned embodiment, the sampling is performed at the sampling frequency (substantially) equal to the beat frequency. However, the present invention is not limited to such sampling. For example, when a frequency which is an integral multiple of the beat frequency of the interference light beam is applied as the sampling frequency, each of a plurality of phase ranges of the interference light beam can be periodically sampled. According to such a method, the plurality of phase ranges can be sampled for each period of the interference light beam, so the interference light can be analyzed in more detail. Therefore, it can be expected to improve the measurement precision.

It is also possible to apply a sampling frequency which is an integral submultiple (1/n) of the beat frequency. According to such a method, a predetermined phase range of the interference light beam is sampled every n-periods. Therefore, this method can be efficiently used in the case where the intensity changed by the intensity modulating means cannot follow the beat frequency.

(With Respect to Duty Ratio)

It is preferable that the sampling function used for the optical image measuring apparatus of the present invention have the duty of 50%. This reason is as follows. That is, when the duty is smaller than 50%, the quantities of light beams received by the CCDs 21, 22, and 23 is decreased to reduce the detection efficiency of the interference light beam. On the other hand, even when the duty ratio exceeds 50%, the detection efficiency reduces. However, for example, when sampling is performed as shown in FIGS. 3 to 5, it is possible to apply a desirable duty ratio as appropriate.

(With Respect to Waveform of Sampling Function)

With respect to the sampling function used for the optical image measuring apparatus of the present invention, in order to suitably control the open-and-close timings of the shutters 31, 32, and 33, it is preferable to use the rectangular waveform as shown in FIG. 2B. Of course, a sampling function having a waveform other than a rectangle, such as a sine wave or a triangular wave, can be used as appropriate. In particular, when the intensity modulating means other than the shutter means for switching between passing and cutting off of the interference light beam is used, it is possible to effectively use a waveform other than a rectangle. For example, when the intensity of the transmitted interference light beam is modulated by successively changing the transmittance of the intensity modulating means using a sampling function having a sine waveform or a rectangular waveform, the intensity of the interference light beam received by the CCD can be successively modulated.

In addition, the same sampling as that using the sampling function having the rectangular waveform can be performed using the sampling function having, for example, the sine wave. For example, when a beat signal detected by a photo detector having high frequency responsibility or the like is assumed to be a sine waveform, sampling of the interference light beam can be controlled based on the detected signal. More specifically, for example, $\pm 1/\sqrt{2}$ of a maximal amplitude of the detected beat signal is set as a threshold value. When the amplitude passes through the threshold value, on and off of the shutter are instantly switched. At this time, phase ranges $\pi/4$ to $3\pi/4$ and $5\pi/4$ to $7\pi/4$ of the interference light beam are sampled. The duty ratio is 50% and the sampling frequency is a value twice as high as the beat frequency. Note that the threshold value is not limited to $\pm 1/\sqrt{2}$ of the maximal amplitude and thus can be set to an arbitrary value. The number of switching between the on and off of the shutter for one period of the beat signal may be any number but four.

When the threshold value is changed as appropriate, it is possible to arbitrarily adjust the quantity of the interference light beam received by the CCD. With respect to an example using such a light quantity adjusting function, there is the case where, in the optical image measuring apparatus 1 shown in FIG. 1 in which the optical path of the interference light is divided for detection into the plurality of optical paths, the quantity of the interference light is not uniformly divided owing to, for example, the influences of transmittances and reflectances of the respective beam splitters. However, when the above-mentioned threshold value for controlling the shutter located on each of the optical paths is suitably adjusted, it is possible to uniform the quantities of light beams received by the respective CCDs.

When the sampling function having the sine waveform is used, it is expected to improve a calculation speed related to Fourier analysis. Thus, it may be possible to suitably improve a response speed of the photo detection means such as the CCD.

(Other Modified Examples)

Hereinafter, other modified examples of the optical image measuring apparatus 1 according to the above-mentioned embodiment will be described. First, the optical image measuring apparatus according to the present invention is not limited to the structure in which the optical path of the interference light is divided into the three optical paths as in the above-mentioned embodiment. As also described in the modified examples of the mode for obtaining the direct current component, the number of optical paths for detecting the interference light beam is arbitrary. For example, assume that the optical path of the interference light is divided into a plurality of optical paths, for example, four optical paths.

In this case, as also shown in FIG. 6, it is preferable to provide the photo detection means such as the CCD on each of the four optical paths. In addition to this, it is preferable to further provide the intensity modulating means such as the shutter on each of three optical paths other than an optical path or provide the intensity modulating means on each of the four optical paths. Note that a design for providing the intensity modulating means on any number of optical paths of the plurality of divided optical paths can be employed according to a measurement method and a calculation method.

In addition to the CCDs 21, 22, and 23, a line sensor including an integrating circuit, or the like can be applied as the photo detection means in the optical image measuring apparatus according to the present invention. Various types of one-dimensional or two-dimensional devices having both a function for receiving the interference light beam and performing photoelectric conversion thereon and a function for storing charges caused by the received interference light beam can be used for the photo detection means in the present invention.

In the embodiment of the present invention as described above, the optical image measuring apparatus having the Michelson type interference optical system has been described. It is also possible to use another interference optical system such as a Mach-Zehnder type interference optical system (for example, see JP 3245135 B).

An optical fiber (bundle) used as a light guide member is provided in a part of the interference optical system. Therefore, the degree of freedom of apparatus design can be improved, the apparatus can be made compact, or the degree of freedom of location of the object to be measured can be improved (for example, see JP 3245135 B).

When the optical image measuring apparatus of the present invention is applied to, for example, an ophthalmologic field, two-dimensional sectional images of retina and cornea, and the like can be obtained in addition to the blood flow measurement on the eye fundus. Therefore, it is possible to measure, for example, the number of endothelial cells of the cornea. Various other applications are also possible in other fields such as a medical field and an industrial field.

The above-mentioned detailed structures are merely examples of the optical image measuring apparatus according to the embodiment of the present invention. Thus, various modifications can be made without departing from the spirit of the present invention.

What is claimed is:

1. An optical image measuring apparatus for forming an image of an object to be measured based on interference light, comprising:
    a light source for emitting a light beam;
    an optical interference system that divides the light beam emitted from the light source into signal light propagating through the object to be measured and reference light propagating through a predetermined reference object, shifts a frequency of the signal light and a frequency of the reference light relative to each other, and then superimposes the signal light propagating through the object to be measured and the reference light propagating through the predetermined reference object on each other to produce the interference light;
    intensity modulator operable to modulate an intensity of the interference light at a predetermined frequency;
    a photo detector for receiving the interference light whose intensity is modulated and converting the received interference light into an electrical signal to be outputted; and
    calculator operable to calculate an intensity of a direct current component composed of background light of the interference light based on the electrical signal outputted from the photo detectors,
    wherein the intensity modulator modulates the intensity of the interference light beam at a frequency which is not synchronized with a beat frequency of the interference light beam, and
    the calculator time-averages the electrical signal outputted from the photo destector based on the interference light beam whose intensity is modulated at the frequency to calculate the intensity of the direct current component.

2. An optical image measuring apparatus, comprising:
    a light source for emitting a light beam;
    an optical interference system that divides the light beam emitted from the light source into signal light propagating through the object to be measured and reference light propagating through a predetermined reference object, shifts a frequency of the signal light and a frequency of the reference light relative to each other, and then superimposes the signal light propagating through the object to be measured and the reference light propagating through the predetermined reference object on each other to produce the interference light;
    optical path divider operable to drive an optical path of the interference light produced by the interference optical system into a plurality of optical paths to produce a plurality of interference light beams;
    at least one intensity modulator operable to modulate an intensity of at least one of the interference light beams at a predetermined frequency, which is provided on at least one first optical path of the plurality of optical paths;
    a plurality of photo detectors each provided on each of the plurality of optical paths, where at least one first photo detector of the plurality of photo detectors which is provided on the first optical path receives at least one interference light beam whose intensity is modulated and converts the received interference light beam into an electrical signal to be outputted and at least one second photo detector of the plurality of photo detectors which is provided on at least one second optical path other than the first optical path receives at least one interference light beam and converts the received interference light beam into an electrical signal to be outputted; and
    calculator operable to calculate an intensity of a direct current component based on the electrical signal outputted from the photo detector provided on a predetermined optical path of the plurality of optical paths,
    wherein an image, of the object to be measured is formed based on the interference light beams propagating on the plurality of optical paths,
    wherein the intensity modulator modulates the intensity of the interference light beam at a frequency which is not synchronized with a beat frequency of the interference light beam, and
    the calculator time-averages the electrical signal outputted from the photo detector based on the interference light beam whose intensity is modulated at the frequency to calculate the intensity of the direct current component.

3. An optical image measuring apparatus according to claim 2, wherein the predetermined optical path comprises at least two optical paths, on each of which the intensity modulator is provided, each of the at least two intensity modulator provided on the optical paths modulates the intensity of the interference light beam such that a part of the interference light beam in which a phase difference is π (180 degrees) is received by the photo detector provided on a corresponding optical path, and the calculator time-averages the electrical signals outputted from the photo detectors to calculate the intensity of the direct current component.

4. An optical image measuring apparatus according to claim 2, wherein the predetermined optical path comprises an optical path in which the intensity modulator is not provided, and the calculator time-averages the electrical signal outputted from the photo detector located on the optical path in which the intensity modulator is not provided to calculate the intensity of the direct current component.

5. An optical image measuring apparatus according to claim 1, wherein the intensity modulator modulates the intensity of the interference light beam plural times such that a part of the interference light beam in which a phase difference is π is received by the photo detector, the photo detector receives the interference light beam corresponding to each intensity modulation and outputs the received interference light beam as an electrical signal, and the calculator time-averages the electrical signal corresponding to each intensity modulation which is outputted from the photo detector to calculate the intensity of the direct current component.

6. An optical image measuring apparatus for forming an image of an object to be measured based on interference light, comprising:

a light source for emitting a light beam;

an optical interference system that divides the light beam emitted from the light source into signal light propagating through the object to be measured and reference light propagating through a predetermined reference object, shifts a frequency of the signal light and a frequency of the reference light relative to each other, and then superimposes the signal light propagating through the object to be measured and the reference light propagating through the predetermined reference object on each other to produce the interference light;

intensity modulator operable to modulate an intensity of the interference light at a predetermined frequency;

photo detector operable to receive the interference light whose intensity is modulated and converting the received interference light into an electrical signal to be outputted;

calculator operable to calculate an intensity of a direct current component composed of background light of the interference light and at least one of an intensity and/or phase of an alternating current component of the interference light based on the electrical signal outputted from photo detector; and light receiving time changer operable to change a light receiving time of the interference light beam received by the photo detector between a first light receiving time equal to or longer than a beat period of the interference light beam and a second light receiving time shorter than the beat period in accordance with the beat period, wherein the calculator time-averages an electrical signal outputted from the photo detector to calculate the intensity of the direct current component when the light receiving time is changed to the first light receiving time by the light receiving time changer, and calculates at least one of the intensity and/or phase of the alternating current component based on an electrical signal outputted from the photo detector when the light receiving time is changed to the second light receiving time and the direct current component whose intensity is calculated corresponding to the first light receiving time.

7. An optical image measuring apparatus according to claim 6, wherein the light receiving time changer changes the light receiving time every beat period of the interference light, and the first light receiving time is the beat period.

8. An optical image measuring apparatus according to claim 6, wherein the light receiving time changer changes the light receiving time every beat period of the interference light, and the second light receiving time is half of the beat period.

9. An optical image measuring apparatus according to claim 6, wherein the predetermined frequency at which the intensity of the interference light is modulated by the intensity modulator is an integral multiple of a beat frequency of the interference light.

10. An optical image measuring apparatus according to claim 1, wherein the intensity modulator comprises shutter configured to cut off the interference light at the predetermined frequency.

11. An optical image measuring apparatus according to claim 2, wherein the intensity modulator modulates the intensity of the interference light beam plural times such that a part of the interference light beam in which a phase difference is π is received by the photo detector, the photo detector receives the interference light beam corresponding to each intensity modulation and outputs the received interference light beam as an electrical signal, and the calculator time-averages the electrical signal corresponding to each intensity modulation which is outputted from the photo detector to calculate the intensity of the direct current component.

12. An optical image measuring apparatus according to claim 2, wherein the intensity modulator comprises shutter configured to cut off the interference light at the predetermined frequency.

13. An optical image measuring apparatus according to claim 6, wherein the intensity modulator comprises shutter configured to cut off the interference light at the predetermined frequency.

* * * * *